United States Patent
Pintaric et al.

(10) Patent No.: US 10,380,804 B1
(45) Date of Patent: Aug. 13, 2019

(54) SEAMLESS INJECTION OF AUGMENTED THREE-DIMENSIONAL IMAGERY USING A POSITIONALLY ENCODED VIDEO STREAM

(71) Applicant: IMAJION CORPORATION, Syracuse, NY (US)

(72) Inventors: Mario Pintaric, Scarborough (CA); Kyle Thomas Foley, Sparta, NJ (US); Adrian James Hatch, Washington, DC (US)

(73) Assignee: Imajion Corporation, Syracuse, NY (US)

( * ) Notice: Subject to any disclaimer, the term of this patent is extended or adjusted under 35 U.S.C. 154(b) by 0 days.

(21) Appl. No.: 16/042,010

(22) Filed: Jul. 23, 2018

Related U.S. Application Data

(60) Provisional application No. 62/679,245, filed on Jun. 1, 2018.

(51) Int. Cl.
| | |
|---|---|
| *G06T 19/00* | (2011.01) |
| *G06T 7/60* | (2017.01) |
| *G06T 7/70* | (2017.01) |
| *G06T 7/50* | (2017.01) |
| *G06T 17/20* | (2006.01) |
| *H04N 5/232* | (2006.01) |

(52) U.S. Cl.
CPC ............. *G06T 19/006* (2013.01); *G06T 7/50* (2017.01); *G06T 7/60* (2013.01); *G06T 7/70* (2017.01); *G06T 17/20* (2013.01); *H04N 5/23212* (2013.01); *H04N 5/23258* (2013.01)

(58) Field of Classification Search
None
See application file for complete search history.

(56) References Cited

U.S. PATENT DOCUMENTS

| | | | |
|---|---|---|---|
| 7,796,155 B1 | 9/2010 | Neely, III et al. | |
| 8,509,315 B1* | 8/2013 | Petranovich | H04N 21/4305 375/240.01 |
| 9,268,406 B2 | 2/2016 | Geisner et al. | |
| 9,645,394 B2 | 5/2017 | Kinnebrew et al. | |
| 9,779,548 B2 | 10/2017 | Weisman et al. | |

(Continued)

OTHER PUBLICATIONS

Clementlee20000, TimeSynchronization.wiki posted since Jun. 3, 2017 @https://github.com/sccn/labstreaminglayer/wiki/TimeSynchronization.wiki (Year: 2017).*

*Primary Examiner* — Yingchun He
(74) *Attorney, Agent, or Firm* — Fish & Richardson P.C.

(57) ABSTRACT

Methods, systems, and apparatus, including computer programs encoded on a computer storage medium, for a multi-peer telepresence communications system. In one aspect, a method includes formulating a geometry of an environment based on sensor data collected from the environment by at least one sensor; capturing, with a camera, a plurality of video frames of the environment and associating each of the captured video frames with spatial transform data of the camera within the geometry of the environment; providing the video frames and associated camera position data to a remote peer; compositing, by the remote peer, the video frames and associated camera position data to generate a local composite; and displaying, on the remote peer, a three-dimensional augmented reality of the environment based on the local composite.

20 Claims, 10 Drawing Sheets

(56) References Cited

U.S. PATENT DOCUMENTS

| | | | |
|---|---|---|---|
| 9,824,495 B2 | 11/2017 | Hagbi et al. | |
| 9,940,750 B2 | 4/2018 | Dillavou et al. | |
| 2011/0310960 A1* | 12/2011 | Lee | H04N 19/136 |
| | | | 375/240.02 |
| 2013/0083003 A1* | 4/2013 | Perez | G06F 3/005 |
| | | | 345/419 |
| 2013/0215229 A1 | 8/2013 | Yerli | |
| 2013/0249947 A1 | 9/2013 | Reitan | |
| 2014/0368537 A1 | 12/2014 | Salter et al. | |
| 2015/0193986 A1* | 7/2015 | Nistel | G06T 19/20 |
| | | | 345/426 |
| 2016/0005229 A1* | 1/2016 | Lee | G06F 3/0488 |
| | | | 345/419 |
| 2017/0115488 A1 | 4/2017 | Ambrus et al. | |
| 2017/0237789 A1 | 8/2017 | Harner et al. | |
| 2017/0264928 A1 | 9/2017 | Hutten | |
| 2017/0295229 A1 | 10/2017 | Shams et al. | |
| 2017/0301140 A1 | 10/2017 | Smith et al. | |
| 2017/0358137 A1 | 12/2017 | Auten et al. | |

* cited by examiner

Right-handed Coordinate System

Left-handed Coordinate System

SEAMLESS INJECTION OF AUGMENTED THREE-DIMENSIONAL IMAGERY USING A POSITIONALLY ENCODED VIDEO STREAM

CLAIM OF PRIORITY

This application claims priority under 35 USC § 119(e) to U.S. Patent Application Ser. No. 62/679,245, filed on Jun. 1, 2018, the entire contents of which are hereby incorporated by reference.

BACKGROUND

Virtual reality (VR) may refer to an immersive multimedia or computer-simulated reality. VR may replicate an environment that simulates a physical presence in places in the real world and allow a user to interact in that world. Augmented reality (AR), which may also be referred to as mixed reality (MR), which can also be referred to hybrid reality, may refer to a live view of a physical, real-world environment. Such a view can be direct or indirect and include elements that are augmented and/or supplemented by computer-generated sensory input, such as sound, video, graphics, or global positioning system (GPS) data. AR views may also merge real and virtual worlds to produce new environments and visualizations where physical and digital objects co-exist and interact in real time. In some examples, AR is an overlay of synthetic content on the real world that is anchored to and interacts with the real world in real time.

SUMMARY

Implementations of the present disclosure are generally directed to a communications system. More specifically, implementations are directed to a real-time, multi-peer telepresence communications system that provides for a three-dimensional (3D) AR.

In a general implementation, a computer-implemented method for displaying a 3D AR of an environment on a remote peer includes: formulating a geometry of an environment based on sensor data collected from the environment by at least one sensor; capturing, with a camera, a plurality of video frames of the environment and associating each of the captured video frames with spatial transform data of the camera within the geometry of the environment; providing the video frames and associated camera position data to a remote peer; compositing, by the remote peer, the video frames and associated camera position data to generate a local composite; and displaying, on the remote peer, a 3D AR of the environment based on the local composite.

In another general implementation, one or more non-transitory computer-readable storage media are coupled to one or more processors and having instructions stored thereon. When the instructions are executed by the one or more processors, the one or more processors perform operations. The operation include: formulating a geometry of an environment based on sensor data collected from the environment by at least one sensor; capturing, with a camera, a plurality of video frames of the environment and associating each of the captured video frames with spatial transform data of the camera within the geometry of the environment; providing the video frames and associated camera position data to a remote peer; compositing, by the remote peer, the video frames and associated camera position data to generate a local composite; and displaying, on the remote peer, a 3D AR of the environment based on the local composite.

In yet another general implementation, a system includes a remote peer, a one or more processors, and a computer-readable storage device coupled to the one or more processors. The remote peer includes a 3D accelerated graphics chip and a display. The computer-readable storage device storing instructions stored that when executed by the one or more processors, cause the one or more processors to perform operations. The operation include: formulating a geometry of an environment based on sensor data collected from the environment by at least one sensor; capturing, with a camera, a plurality of video frames of the environment and associating each of the captured video frames with spatial transform data of the camera within the geometry of the environment; providing the video frames and associated camera position data to a remote peer; compositing, by the remote peer, the video frames and associated camera position data to generate a local composite; and displaying, on the remote peer, a 3D AR of the environment based on the local composite.

In an aspect combinable with any of the general implementations, the operations or method includes rendering, by the remote peer, a 3D element, wherein the local composite includes compositing the 3D element onto each of the video frames.

In an aspect combinable with any of the general implementations, the operations or method includes determining an occlusion mesh of the environment; and providing the occlusion mesh to the remote peer, wherein compositing the 3D element onto each of the video frames is based on the how the occlusion mesh affects the visibility of the 3D element.

In another aspect combinable with any of the previous aspects, compositing the 3D element onto each of the video frames includes mapping feature points of the 3D element.

Another aspect combinable with any of the previous aspects, the camera position data is provided to the remote peer as header data.

In another aspect combinable with any of the previous aspects, the video frames are provided to the remote peer through a first stream, wherein the camera position data is provided to the remote peer through a second stream.

In an aspect combinable with any of the general implementations, the operations or method includes determining, by the remote peer, an average frame offset for a time difference between a host clock and a local clock; and synchronizing, by the remote peer, the first and second streams based on the average frame offset.

In another aspect combinable with any of the previous aspects, the spatial transform data of the camera is determined through an inertial measurement unit (IMU) sensor that detects linear acceleration of the camera and a rotational rate of the camera using one or more depth sensors.

In an aspect combinable with any of the general implementations, the operations or method includes determining a focal point in the geometry of the environment based on the spatial transform data of the camera; and defining an origin of a coordinate system for the camera according to the focal point.

In another aspect combinable with any of the previous aspects, the focal point is determined at a Euclidean geometry of 0x, 0y, 0z, such that a Z projection from the focal point is positive from the focal point.

Particular implementations of the subject matter described in this disclosure can be implemented so as to realize one or more of the following advantages. The described system can be implemented to reduce the number of potential "conceivers" of ideas related to video transmission systems for AR by an order of magnitude. The described system increases performance by reducing the workload of the host peer while maintaining a higher levels of detail for the local AR experience at each remote peer. Because a host AR device, such as the HoloLens™, does not need to generate the same level of detail as may be required by a remote peer, the workload of the host device is dramatically reduced and thus improves overall performance. Further, the level of detail for the rendering can be configured independently at each remote peer based on, for example, local performance criteria or available resources. Moreover, the described system addresses accessibility smoothly as each remote peer can composite in an accessible friendly way without affecting the other remote peers. Privacy and/or role appropriate details may also be implemented since each of the remote peers and the host peer may select information to remain private. Additionally, each remote peer can create a unique AR view based on the received stream. The described system increases data security as each remote peer may limit the transmission of data to other peers. Also, because compositing is not baked into the originating host's video stream, re-use of the video stream is possible.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
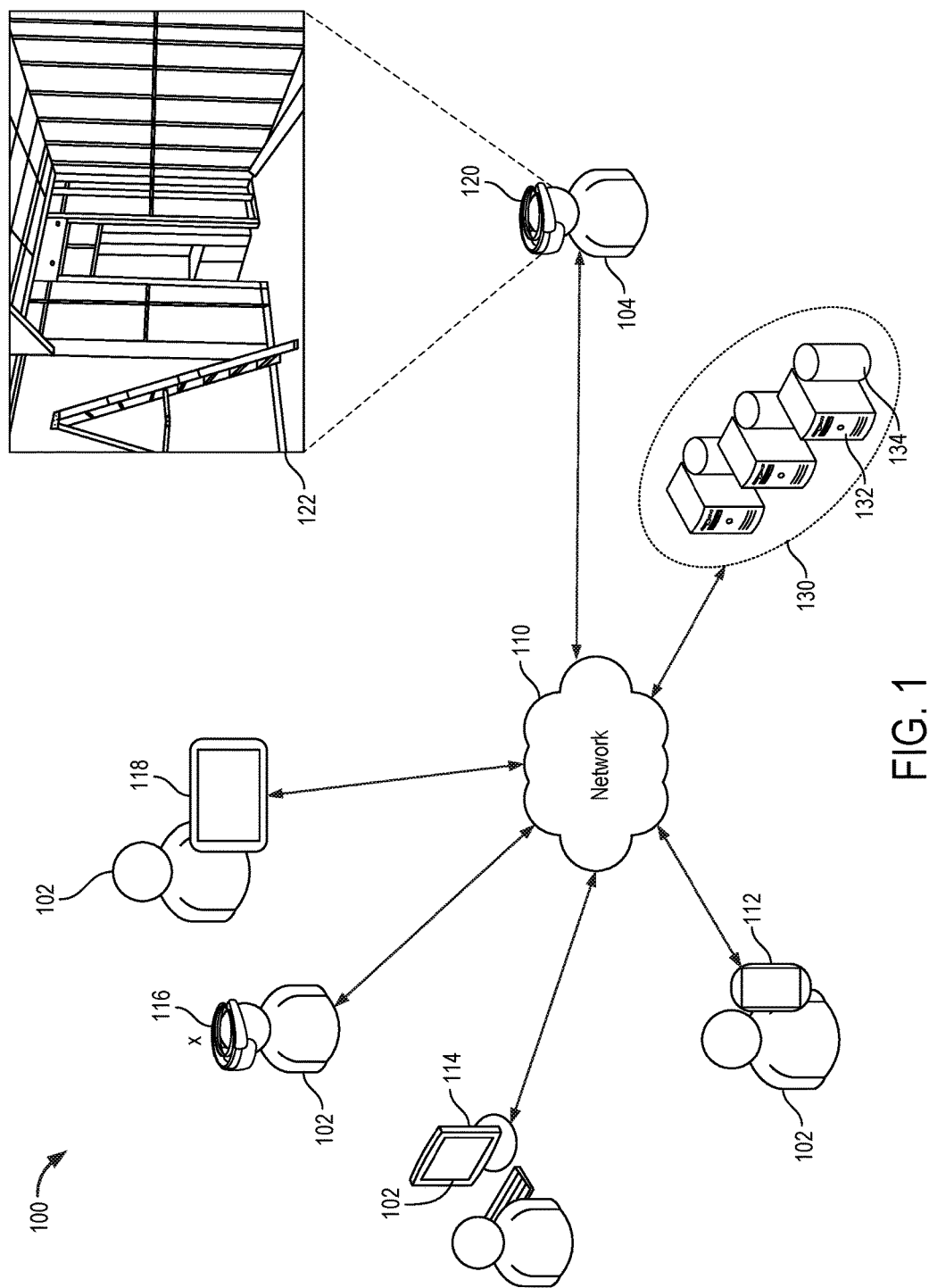
FIG. 1 depicts an example environment that can be employed to execute implementations of a multi-peer telepresence communications system.

Implementations of the present disclosure are generally directed to sharing a video stream over a network. More particularly, implementations of the present disclosure are directed to encoding video streams with camera positional data to permit subsequent post processing of video stream frames to facilitate injection of 3D holographic elements. During post processing, mesh data is transmitted across a data channel to apply positionally correct occlusion to the holographic data that is injected.

In view of the foregoing, and as described in further detail herein, implementations of the present disclosure provide a multi-peer telepresence communications system. The described system provides for shared communication of a video stream to, for example, a communications group. A communications group may include a host peer and remote peers. The shared video stream may originate from the host peer. During a shared communications session, each of the remote peers can effectively see through the "eyes" of the host peer through the shared video stream. Each of the peers may also inject holographic elements (e.g., imagery, 3D objects) into the shared video stream such that the stream effectively becomes a shared canvas.

In some implementations, the host peer provides a video stream without compositing the injected holographic elements onto each video frame within the video stream. Instead, each of the collectively injected holographic elements are rendered and composited into the video stream locally (e.g., at the remote peer devices) while simultaneously visible, through the shared video stream, to the other peers. Compositing includes the combining of visual elements. For example, each remote peer may perform compositing of a received stream to generate a local composite. Such a local composite may include the originating video stream (as seen by the host peer prior to injection of holographic elements) and the collectively injected holographic elements. In some implementations, the remote devices perform compositing of the injected 3D content through a combination of hardware and software, which are then rendered on top of each frame/image. For example, the injected 3D content can be integrated into the scene as the camera/host peer is viewing it. In some implementations, merging layers is similar to video compositing, where a form of masking is applied to specific areas of an image element. For example, an applied masque can be a portion that is opaque with a gradient of transparent-ness around the border area of the masque. In such an example, the area toward the center of the masque may comprise the image overlay part of what is to be overlaid. Furthermore, it is also possible to have transparent-ness within the central areas of the masque in order to accommodate "holes" within the overlay image element. This masque is then layered on top of the other image so that it appears seamlessly integrated. In some implementations, peers may also share a multi-way audio channel.

In some implementations, a recorded video stream may be re-visualized with new content. The re-visualization may be performed on one of the remote peers or the host peer in the original communication group or on a device that was not a part of the original communication group. In some implementations, a re-visualization may be shared among peers, in the original communication group or in a new communication group, through a new shared communication session. The re-visualization can include new and/or different elements that are injected into the stream frames. For example, the placement of pipes shown on the side of a wall in the first viewing of the video stream can be shown on a different wall in a subsequent viewing of the stream.

The described multi-peer telepresence communications system seamlessly integrates the injected holographic elements such that the injected elements track in a positionally correct manner with the physical content of the host peer's real-world environment. For example, the injected holographic elements are correctly occluded by the physical objects in the host's real-world environment. From the perspective of the host, the injected holograms appear integrated into their real-world space while each of the remote peers has a perspective as though they are looking through the eyes of the host peer.

The described system increases performance by reducing the workload of the host peer while maintaining a high level of detail for the local AR experience at each remote peer. For example, pushing the compositing of an AR image elements to the remote peers reduces a significant percentage of a host peer's computing resources. Further, the level of detail for the rendering can be configured independently at each remote peer based on, for example, local performance criteria and/or available resources, such as available central processing unit (CPU)/processor memory. Moreover, the described system addresses accessibility smoothly as each remote peer can composite in an accessibility friendly way without affecting the connections from the host peer to other remote peers. Privacy and/or role appropriate details may also be implemented because each of the remote peers may select information to remain private. Additionally, each remote peer can create a unique AR view based on the received stream that is specific to local content requirements, For example, a remote peer may color code elements in a particular way (e.g., for accessibility) or use a local measuring standard (e.g., the metric system versus an imperial system). The described system also increases data security as each remote peer may limit the transmission of data, such as sensitive information, provided to other peers. Furthermore, because compositing is not baked into the originating host's video stream, re-use of the video stream is possible. For example, original video content may be re-composited with revised content.

FIG. 1 depicts an example environment 100 that can be employed to execute implementations of a multi-peer telepresence communications system. The example environment 100 includes network 110, a back-end system 130, and computing devices 112-120. In an example context within the environment 100, a host user 104 may wear the host computing device 120 (the host peer) and generate a video stream of a viewed space 122, as described in detail below. The stream is delivered through the network 110 to the one or more remote peers with 3D accelerated graphics computing devices (e.g., the computing devices 112-118) to be viewed by the remote users 102. In some implementations, the remote peers 112-118 subscribe to the video stream provided by the host peer 120. The host peer 120 provides the video stream of the user's 104 gaze in real-time to the connected peers 112-118. The viewed space 122 may be any sort of area that the host peer user 104 wants to broadcast from the host peer 120. Example of spaces 122 include, but are not limited to, rooms, construction sites, close up perspectives of machinery such as automobile motors, views of anatomical parts, essentially any indoor or outdoor scene and its content.

In some implementations, the network 110 includes a local area network (LAN), wide area network (WAN), the Internet, or a combination thereof, and connects computing devices (e.g., the computing devices 112-120) and back-end systems (e.g., the back-end system 112). In some implementations, the network 110 can be accessed over a wired and/or a wireless communications link. For example, mobile computing devices (e.g., the smartphone device 102 and the tablet device 106), can use a cellular network to access the network 110.

The computing devices 112-120 may each include any appropriate type of with 3D accelerated graphics computing device. In some implementations, 3D accelerated graphics computing devices include a graphics chip that removes the bulk of the load off the processor and performs the rendering of the image. Graphics chips may include, for example, 3D or a dual-purpose 2D/3D chips. Example 3D accelerated graphics computing devices include an AR device, such as a HoloLens™; a desktop computer; a laptop computer; a handheld computer; a tablet computer; a personal digital assistant (PDA); a cellular telephone; a network appliance; a camera; a smart phone; an enhanced general packet radio service (EGPRS) mobile phone; a media player a navigation device; an email device; a game console; or an appropriate AR computing or other data processing device. In the depicted example, the computing device 112 is provided as a smartphone, the computing device 114 is provided as a desktop computing device, the computing devices 116 and 120 (the host peer) are provided as AR devices, and the computing device 118 is provided as a tablet-computing device. It is contemplated, however, that implementations of the present disclosure can be realized with any of the appropriate computing devices, such as those mentioned previously. For example, implementations may include computing device form factors that can display 3D content and receive real time streamed information in the same manner as existing smartphones, tablet computers, and so forth.

In the depicted example, the host peer 120 may initiate a shared communications session of the space 122 where each frame in the transmitted stream is synchronized with camera position data to allow each of the peer devices 112-118 to accurately render the stream and injected holographic elements. For example, the camera position and the room geometry are synchronized on each remote peer device 112-118 in the rendered video. In some implementations, the camera position data is embedded in each video frame by the host peer 120 so that the motion of the camera (host peer 120) can be transmitted to the remote peers at the same rate as the actual real world motion of the camera at that time in the video. For example, the camera position data may be added to header data for each frame.

In some implementations, a separate stream that includes the camera position data is provided to each remote peer in addition to the video stream to synchronize each frame with the respective camera position for the frame. Such implementations may be employed when, for example, the remote device or an application running on the remote device, such as a web browser, does not have access to the header information. In such implementations, when received by the remote device, the two streams may be out of sync by a set number of frames between the rates at which the transforms are sent versus the rate at which the video frames are sent. Additionally, the streams may be out of sync by a variance. Such a variance can change depending on, for example, the path that is taken between the host peer 120 and each of the remote peers 112-118. For example, a first path may have a different number of hops as compared to a second path.

In some implementations, a synchronized clock may be employed between the host peer 120 and each of the remote peers 112-118 to synchronize data from the video stream and the camera position stream. For example, each of the remote peers 112-118 requests a timestamp from the host peer 120 at the start of a shared communication session. Each of the remote peers 112-118 compares the timestamp provided by the host peer to a respective local clock. This request and associated comparison can be performed a number of times by each of the remote peers 112-118 to determine an average frame offset for the time difference between the host peer's 120 clock and the respective local clock. Once determined, the frame offset can be employed by the remote devices 112-118 to synchronize the streams so that the camera position data can be synchronized with each respective video frame. Additionally, when one of the remote peers 112-118 detects that a clock drift (e.g., the delay is growing frame to frame) has reached a threshold, the remote peer may request a new sync with the host device 120.

In the depicted example, the back-end system 130 includes at least one server system 132 and a data store 134. In some implementations, back-end system 130 provides access to one or more computer-implemented services that users 102 and 104 can interact with using the computing devices 112-120 (the host peer and remote peers). The computer-implemented services may be hosted on, for example, the at least one server system 132 and a data store 134. The computer-implemented services may include, for example, an aggregate and coordination service. Such a service may be used by the peers (both the remote peers 112-118 and the host peer 120) in a shared communication session to aggregate share injected holographic elements and to coordinate the distribution of the video stream and the share injected holographic elements. As an example, a remote peer, such as remote peers 112-118, in an established share communication session may provide content (e.g., a holographic element) to an aggregate and coordination service that is available on the back-end system 130. This back-end system 130 may provide the content to the host peer 120 and/or the other remote peers 112-118. In some implementations, the injected content is sent through a separate communications channel to each peer from the back-end system 130.

In some implementations, the back-end system 130 includes computer systems employing clustered computers and components to act as a single pool of seamless resources when accessed through the network 110. For example, such implementations may be used in data center, cloud computing, storage area network (SAN), and network attached storage (NAS) applications. In some implementations, back-end system 130 is deployed and provides computer-implemented services through a virtual machine(s).

In some implementations, the host peer may communicate directly with one or more remote peers through the network 110. In such implementations, the peers (host and remote) communicate any injected data directly to each other. In some implementations, the injected data is sent through a separate communications channel. Whether provided through a service on the back-end server 120 or through direct, peer-to-peer communication distributing the holographic compositing task reduces the load on individual peers (e.g., host peer 120 and remote peer 112-118).

Figure 2A:
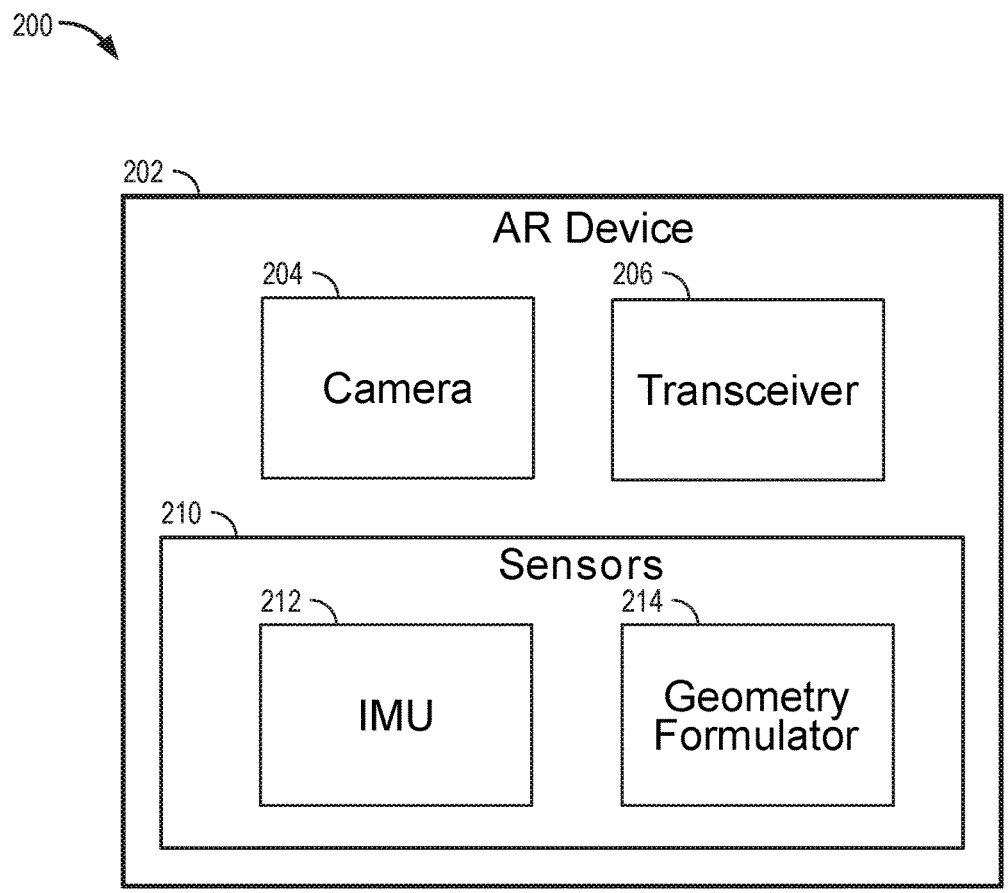
FIG. 2A depicts a schematic of an AR device.

FIG. 2A depicts a schematic 200 of an AR device 202. The AR device 202 can be employed as a host peer and/or remote peer in a multi-peer telepresence communications system, such as depicted in FIG. 1. The AR device 202 includes at least one camera 204, a communications component 206, and sensors 210.

The camera 204 is a device for recording visual images in the form of, for example, a stream of digital video frames. In some implementations, the camera 204 is a range camera, which may employ a collection of techniques to produce a two-dimensional (2D) image showing the distance to points in a scene from a specific point. The camera 204 captures a projection of an image in the camera's field of view onto an image plane. Such an image plane may have a limited field of view, which may not include the entire space to which the camera 204 has exposure and is defined by physical geometry of the camera 204 (see FIGS. 3A-3B that depict the image plane 306 for the camera). The camera captures what this field of view is on a frame-by-frame basis. The captured frames are processed to generate a video stream, which may be used within a shared communication session as described in FIG. 1.

The communications component 206 sends and receives communications signals through a network, such as the network 110 of FIG. 1. These digital communization data can be employed by the AR device 202 to establish a shared communications session to communicate with, for example, the remote peers in a communication group. The communications component 206 may communicate through a wired and a wireless connection to the network. Example wireless communications include WiFi, Bluetooth, infrared, Radio-frequency identification (RFID) transmission, wireless Universal Serial Bus (WUSB), and cellular.

The sensors 210 include components, modules, or subsystems to detect events or changes in the environment and to provide the collected information to other electronics, such as a computer processor (not shown). As depicted in FIG. 2A, the sensors 210 includes at least one IMU 212 and a geometry formulator sensor 214. The IMU 212 is an electronic device that measures and reports the AR device's 202 specific force, the angular rate, and/or the magnetic field surrounding the AR device 202. The IMU 212 may employ a combination of accelerometers, depth sensors, gyroscopes, and/or magnetometers. In some implementations, IMU 212 can be used to track the camera 204 position in six degrees of freedom (6DoF) to understanding the environment around it (e.g., horizontal and vertical surfaces) and/or show digital objects either in immersive or non-immersive environment with 3D depth perspective. In some implementations, the IMU 212 detects linear acceleration using one or more accelerometers and rotational rate using one or more gyroscopes. A configuration of the IMU 212 may include one accelerometer, gyroscope, depth sensor, and magnetometer for each of the three axes: pitch, roll, and yaw, which are depicted as the axes x, z, and y respectively in FIG. 2B.

In some implementations, the geometry formulator sensor 214 formulates the geometry of the space surrounding the AR device 202 while the camera 204 device is operating. The formulated geometry allows the AR device to deconstruct, for example, a room into geometrical elements (e.g., a sofa, doors, windows, and so forth) and to determine the geometry of those elements. The AR device can use the information gathered by the IMU 212 to determine the spatial transform of the camera 204 within the determined geometry. Spatial transform may include both the position and rotation of the camera 204. For example, the origin of the AR device 202 coordinate system (see FIGS. 2B-2D) can be defined according to the position of the AR device 202. In some implementations, the AR device 202 orients the coordinate system using the sensors 210 regardless of the original orientation of the AR device 202. In some implementations, the AR device 202 uses its determined position as a focal point (see FIG. 4).

In some implementations, the AR device 202 captures positional data for the camera 204 through the IMU sensor 212. Using the data collected by the sensors 210, the position and orientation of the camera 204 is collected as the camera records images of a space (e.g., the scene). In some implementations, the IMU sensor 212 may also determine the position of the AR device 202 through a depth sensor. Such a depth sensor may have a fixed and known offset position relative to the image capture plane of the camera 204.

The depth sensor may capture a point cloud of the physical geometry of the viewed scene and translates, through the geometry formulator sensor 214, this point cloud into an occlusion mesh that represents the physical geometry of a given scene. The 3D geometry has a fixed and known offset relative to the camera 204. As depicted, the camera 204 and the depth sensor (IMU sensor 212) are integrated into a the AR device 202, thus a dimensional relationship to each other is known permitting orienting the camera position relative to the occlusion mesh. The occlusion mesh can be used as a form of mask overlay on top of the video image frame to facilitate correct hiding/unhiding of injected 3D objects such that they are correctly covered/uncovered by the physical objects in the real world scene. For example, if a holographic ball is placed behind (relative to a viewer's position) a sofa in the AR environment, the occlusion mesh provides the remote peer information to completely hide this injected 3D element. Continuing with the example, when the viewer adjusted their position, the occlusion mesh would provide the remote peer information to make some part of the ball visible relative to the viewer's position. To state it another way, the occlusion mesh is the mesh geometry of a given space relative to the viewers x, y, and z position, and is used to determine whether an injected 3D object is partially or completely obscured by that geometry.

Once received, the occlusion mesh can be employed by the remote peer(s) to form the occlusion boundaries for injected holograms. In some examples, as described previously, the camera's 204 positional data is embedded within a header of each frame of a respective video stream or within a separate stream to enable the compositing to be performed as a post-processing action on the remote peers. In some implementations, this information (e.g., the camera position data and the occlusion mesh) is provided to a remote peer, to enable the compositing performed on the remote peer to be correct relative to the viewpoint of the camera as the host peer moves and the perspective changes.

In some implementations, the occlusion mesh is provided through a secondary communications channel from the host peer to a remote peer. The secondary communications channel may be completely independent from the type of "channel" used for the video stream. As the host device moves around the environment and changes the geometry, the changed geometry information can be added to the occlusion mesh and provided to the subscribed remote peer(s).

Figure 2B:
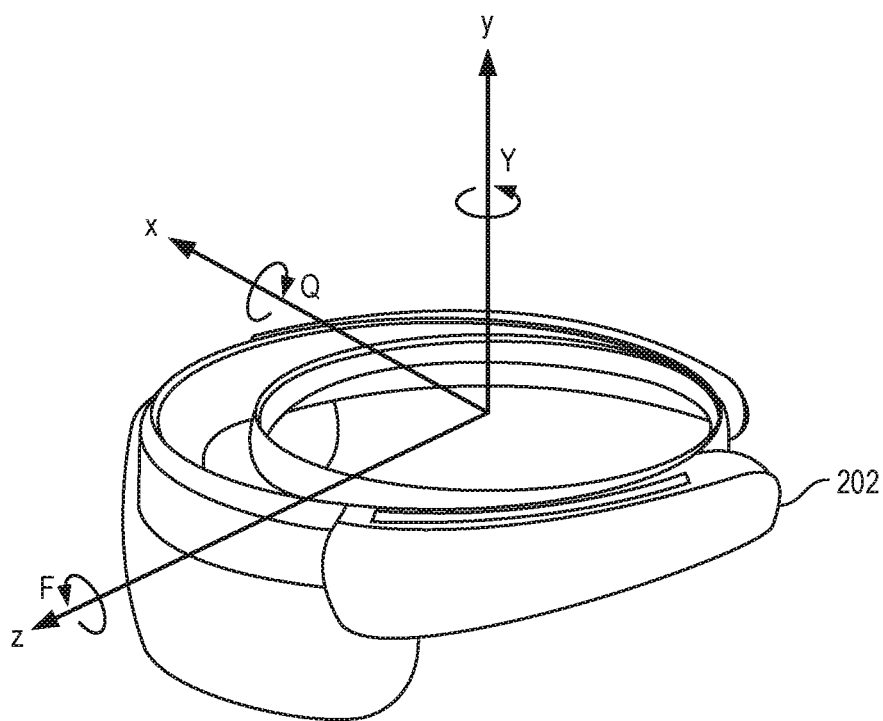
FIGS. 2B-2D depict an example coordinate systems for an AR device.

FIG. 2B depicts an example 220 of a coordinate system for the AR device 202. The coordinate system may be oriented according to a vertical Y-axis (yaw-axis) and a horizontal X (pitch) and Z (roll) axis such that the Z-axis is pointing in front of a user of the device with the X-axis perpendicular to the Z-axis, and such that an X-Z plane is parallel to a planar floor, regardless of the original orientation of the AR device 202. The angular rotation is measured according to the determined coordinate system relative to the respective X, Y, and Z axes.

Figure 2D:
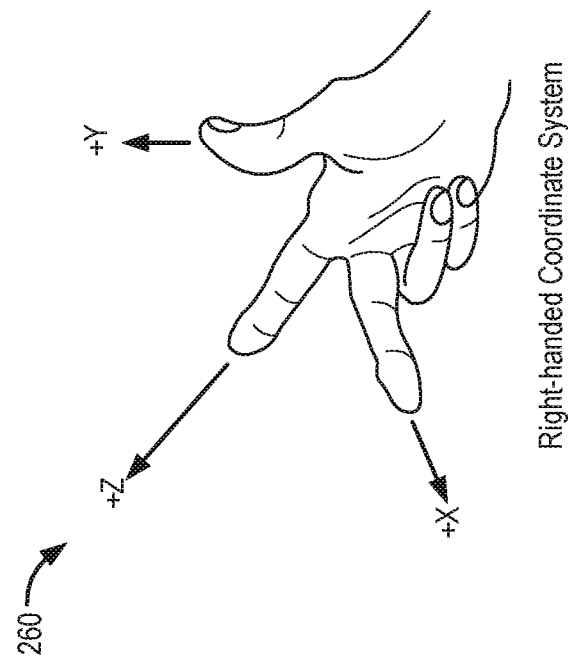
Figure 2C:
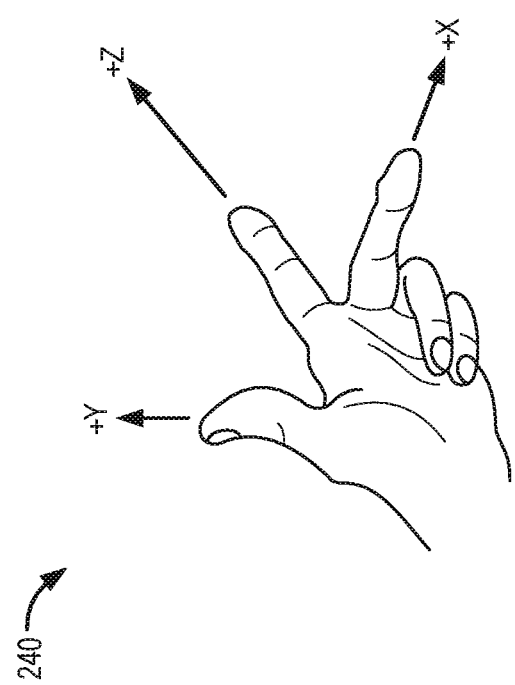

FIGS. 2C-2D depict example of coordinate systems 240 and 260 respectively of the AR device 202. FIG. 2C depicts a left-handed coordinate system 240 from a perspective of a user, such as users 202 and 204 depicted in FIG. 1, of the AR device 202. FIG. 2D depicts a right-handed coordinate system 260 from a perspective of a user of the AR device 202. For some AR devices, mesh data may need to be converted to operate within systems operating in either a left-handed or right-handed coordinate system. Regardless of how a given coordinate system may be oriented, a transform may need to be applied so that a common orientation may be derived when bringing information together from different systems of orientation for a common scene.

Figure 3A:
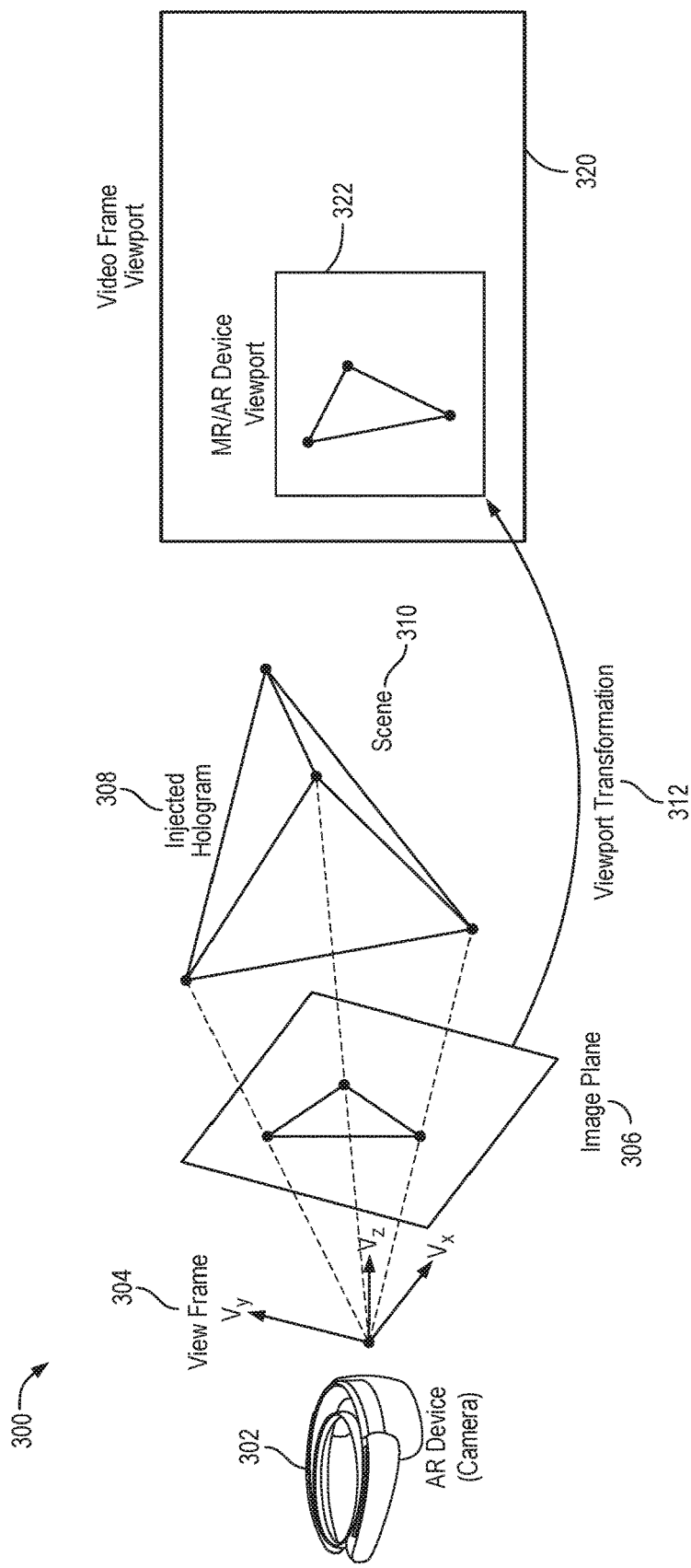
FIG. 3A depicts an example view transformation of a scene captured by an AR device to broadcast to remote peers in through a shared communication session.

FIG. 3A depicts an example view transformation 300 of a scene 310 captured by an AR device 302 to broadcast to remote peers in through a shared communication session. The AR device 302 is substantially similar to the AR devices 106, 120, and 202 as depicted in FIGS. 1 and 2 respectively. When acting as a host peer in a shared communications session, the position of an injected hologram 308 is tracked within the respective video stream by correlating a position of the AR device 302 to a currently viewed video frame as the host device's "gaze" tracks across a the viewed scene 310.

Figure 3B:
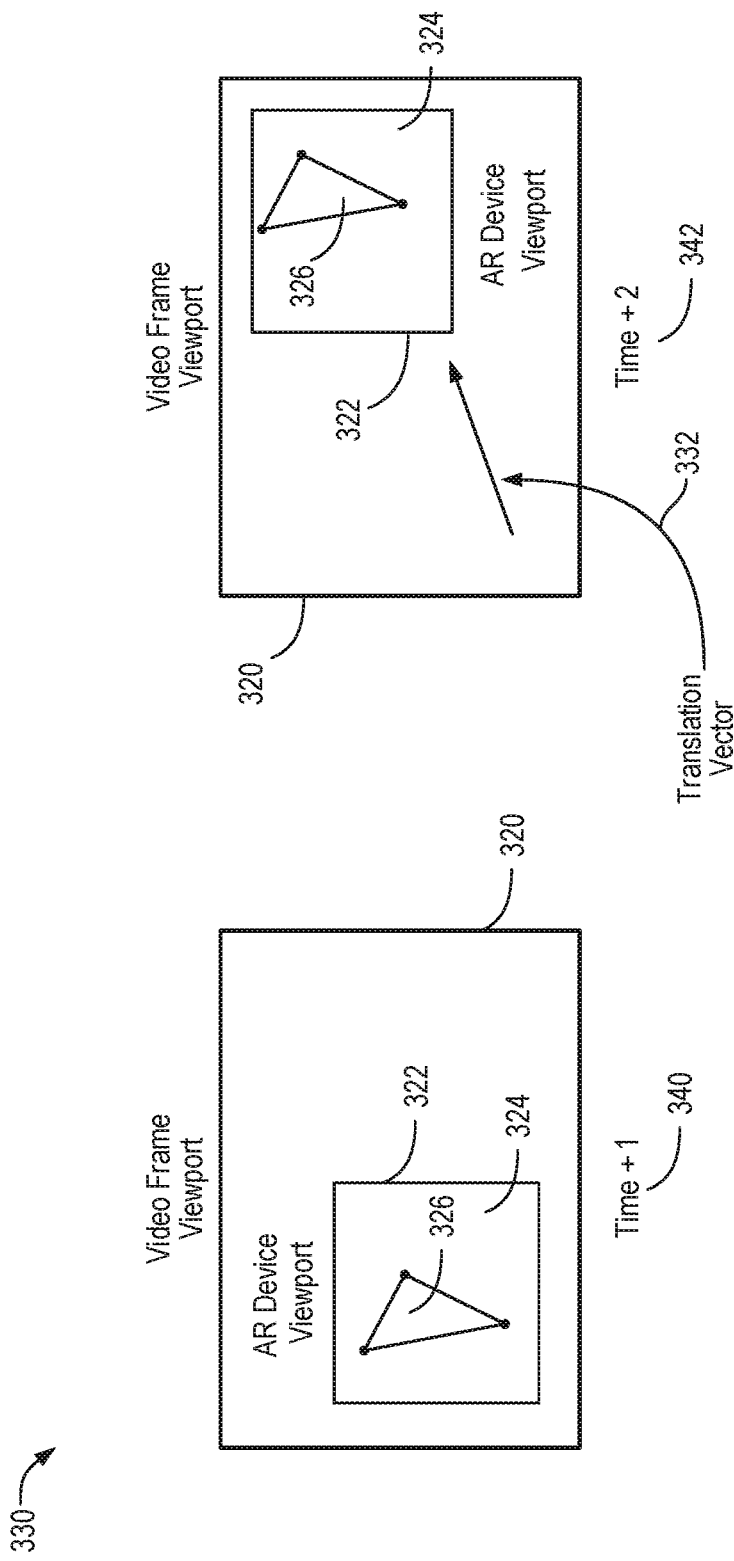
FIG. 3B depicts tracking of the movement of the injected hologram view point of the video frame and the AR device's view point at a given time interval.

As described above, a camera, such as camera 204 in FIG. 2A, may capture a projection of an image in the camera's field of view onto an image plane 306. The image plane 306 may have a limited field of view, which may not include the entire scene 310 to which the camera has exposure. An injected holographic element 308 is injected onto the image plane by a remote peer based on the video stream data, the camera position, and the occlusion mesh. The video frame viewport 320 captures the field of view for the portion of the scene visible through this viewport 310. The AR device viewport 322 is the viewport transformation 312 of the image plane 306. The viewport transformation 312 include the 3D transformation applied to the AR device viewport 322 as the device's position data and content are transmitted to the remote peers. This compensates for the physical differences between the camera mounted on the AR device 302 that captures the scene 310 to an image plane 306 and a display. Such as display may display, for example, the injected content within the AR device's view and the 3D positional data FIG. 3B an aggregate 330 of multiple composited elements that comprise the entire visual at any given instance in time. FIG. 3B shows the tracking of the movement of the injected hologram 308. The "Time+1" 340 depicts an image frame capture at a given instance in time having an AR device viewport 322 that may be smaller than the video frame viewport 320. As depicted, the video frame 320 is larger than the AR device viewport 322. This size discrepancy may be caused by, for example, the depth sensor of the AR device viewport 322 operating at a lower horizontal and vertical resolution than the video frame viewport 320 even though the AR device's depth sensor is integrated into the AR device's camera. In some implementations, the video frame viewport 320 and the AR device viewport may be the same size.

At a Time+1, the AR Device viewport 322 may include two parts: 1) an image element 324, which is a snapshot of what was visible to the camera, and 2) a holographic element 326 (e.g., the injected hologram 308), which is overlaid on top of the image element 324. The AR device viewport 322 incorporates the injected holographic element (326) and is seamlessly blended with the underlying image (324). As depicted, the triangle and its vertices (the injected holographic element 326) may represent anchor points, for example, a 3D geometry that has been detected by the depth sensor in the physical space the wearer of the host peer (e.g., an AR device) is in and is being tracked by the depth sensor as the wearer's gaze shifts across a scene, such as scene 310 of FIG. 3A. The "Time+2" 342 depicts a video frame image at the next instance of time. As depicted, the AR device viewport 322 has shifted within this video frame viewport 320 and the triangle geometry 326 of the physical object's anchor points in the scene has also been shifted.

In some implementations, an AR device's cameras are collocated in a manner that allows the AR Device depth capture cameras to move independently within the video frame viewport area 320. The rendering of Holographic content (injected 3D imagery) may also happen within the AR device viewport area 324 because that is the area within which physical geometry is detected by the depth capture camera.

Figure 4:
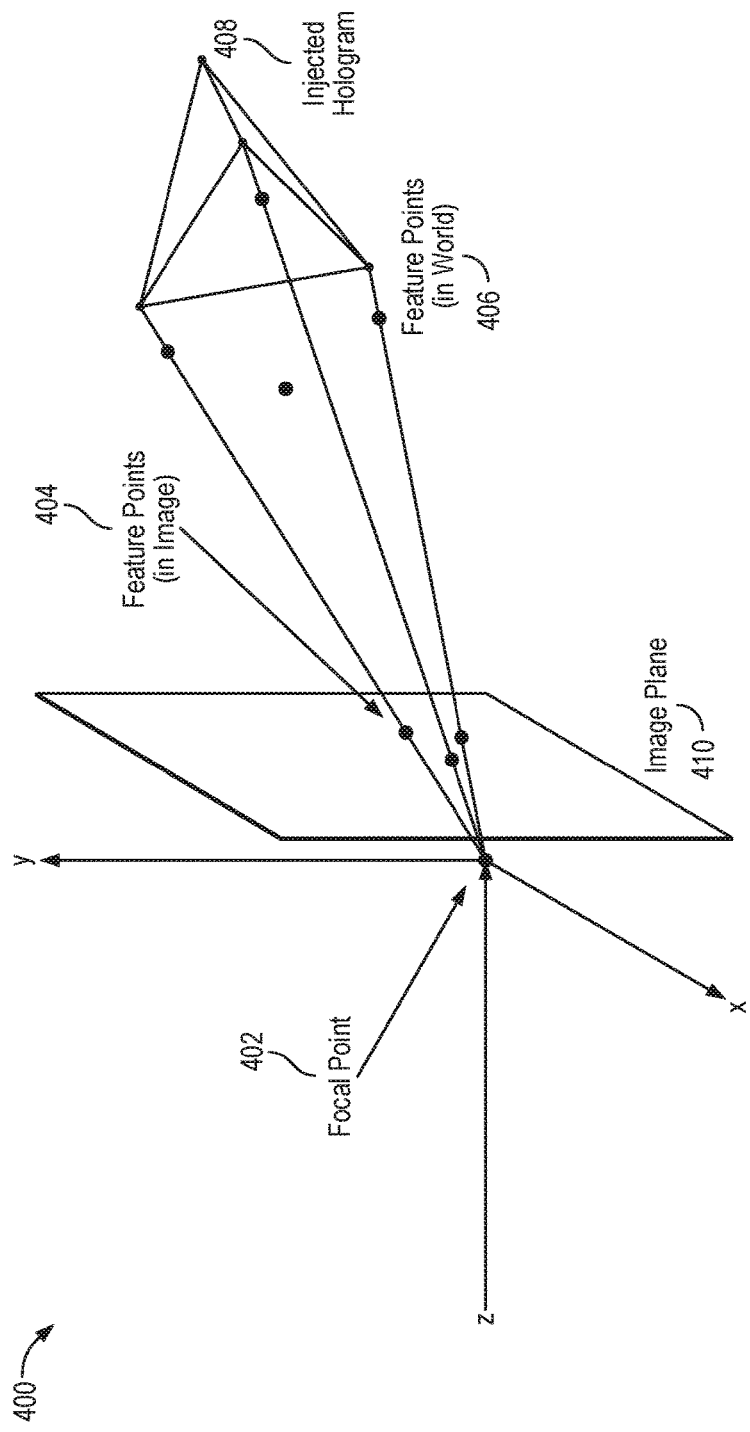
FIG. 4 depicts an example of mapping feature points of an injected holographic element to an image plane.

FIG. 4 depicts an example 400 of mapping feature points 406 of an injected holographic element 408 to an image plane 410. The example mapping 400 may be performed by a remote peer, such as remote peer 412-418 of FIG. 1, based on the received video stream and respective camera position data from each frame in the stream. The focal point 402 is the position of the camera for an AR device. In some examples, feature points are located at the vertices (edge intersections) of physical geometry elements or injected 3D image elements. In some implementations, the focal point may be determined at a Euclidean geometry of 0x, 0y, 0z in the 3D space, such that the Z projection from the focal point (e.g., the camera position) is positive from the focal point. The feature points 406 in the space are determined relative to the focal point 402 (e.g., the position of the camera). The feature points 406 are mapped to feature points 404 respectively in the image plane 410 such that the field of view of the camera is correlated as these feature points 404 track with the feature points 406. The injected hologram 408 can be a position within a given video frame by correlating the camera position to both the current video frame and the feature points of an injected hologram 408. In some implementations, the X, Y, and Z position of the feature points 406 and the angular rotation relative to X, Y, and Z of the camera in relation to the video frame are tracked by the host AR device in relation to the focal point 402 (e.g., through an IMU component of the AR device). A field of view factor associated with the viewport of the AR device (e.g., the host peer) is applied to map the feature points appropriately to the current video frame viewport as shown in FIG. 3A-3B.

Figure 5A:
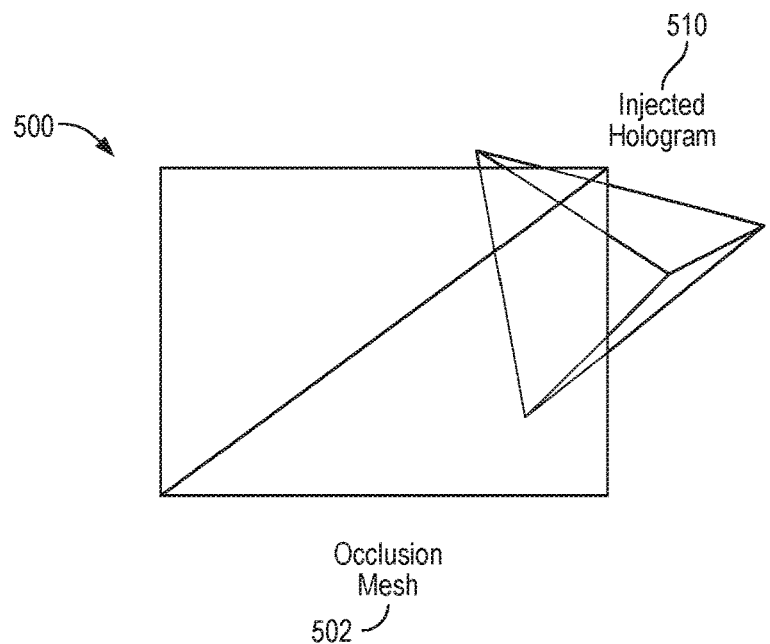
FIGS. 5A and 5B depict examples of 3D occlusion of an injected holographic element.
Figure 5B:
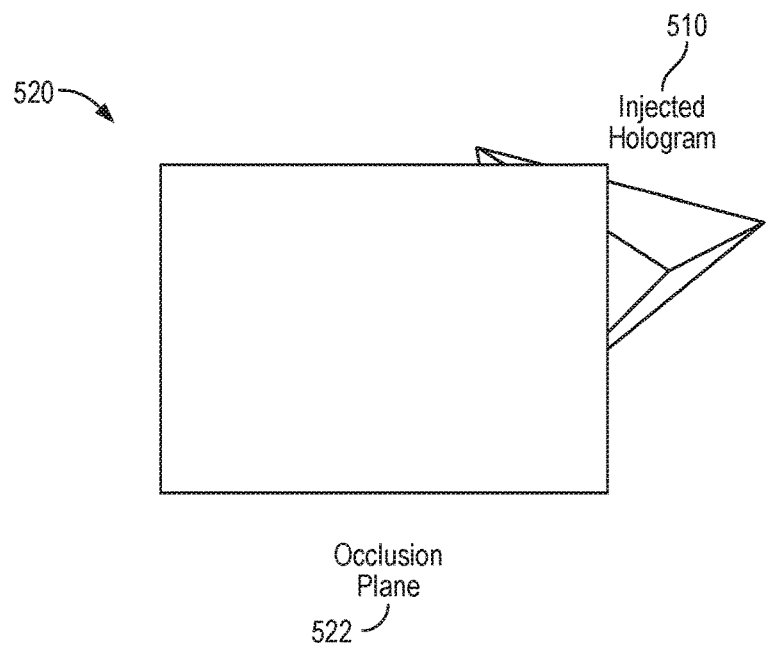

FIGS. 5A and 5B depict examples 500 and 520 respectively of 3D occlusion of an injected holographic element 510. The remote peer receives the occlusion mesh data in the video stream as described above (e.g., in the header information or through a separate stream). This occlusion mesh data allows the remote peer to inject a hologram(s) in a manner that appears both positionally correct within any given video frame of the stream and is correctly occluded by the physical geometry of the scene relative to the X, Y, and Z positioning of the hologram. FIG. 5A depicts an occlusion mesh 502 and the injected holographic element 510 behind the mesh. FIG. 5B depicts the occlusion plane 522 and injected holographic element 510 behind the occlusion plane 522.

Figure 6:
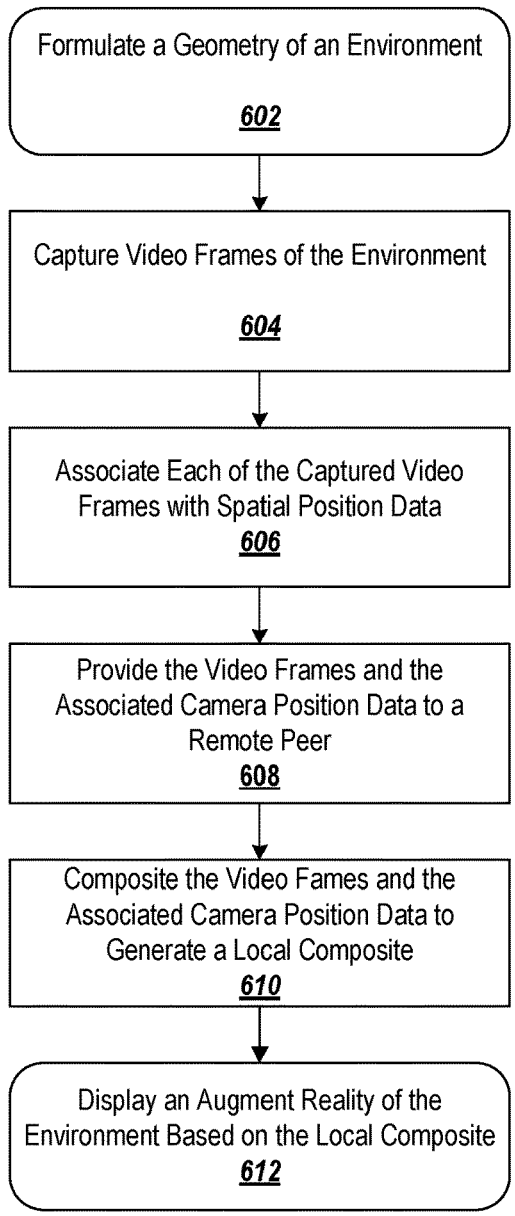
FIG. 6 depicts a flow diagram of an example process employed within a multi-peer telepresence communications system.

FIG. 6 depicts a flow diagram of an example process 600 employed within a multi-peer telepresence communications system for displaying a 3D AR of an environment on a remote peer. A geometry of an environment is formulated (602) based on sensor data collected from the environment by at least one sensor. A plurality of video frames of the environment is captured (604). Each of the captured video frames is associated (606) with spatial transform data of the camera within the geometry of the environment. In some implementations, the spatial transform data of the camera is determined through an IMU sensor that detects linear acceleration of the camera and a rotational rate of the camera using one or more depth sensors. In some implementations, a focal point in the geometry of the environment is determined based on the spatial transform data of the camera and an origin of a coordinate system is defined for the camera according to the focal point. In some implementations, the focal point is determined at a Euclidean geometry of 0x, 0y, 0z, such that a Z projection from the focal point is positive from the focal point. The video frames and associated camera position data is provided (608) to a remote peer. In some implementations, the camera position data is provided to the remote peer as header data. In some implementations, the video frames are provided to the remote peer through a first stream and the camera position data is provided to the remote peer through a second stream. In some implementations, the remote peer determines an average frame offset for a time difference between a host clock and a local clock and synchronizes the first and second streams based on the average frame offset. The video frames and associated camera position data are composited (610) by the remote peer to generate a local composite. In some implementations, the remote peer renders a 3D element and the local composite includes compositing the 3D element onto each of the video frames. In some implementations, an occlusion mesh of the environment is determined and provided to the remote peer. In such implementations, the compositing of the 3D element onto each of the video frames is based on the how the occlusion mesh affects the visibility of the 3D element. In some implementations, compositing the 3D element onto each of the video frames includes mapping feature points of the 3D element. A 3D AR of the environment is displayed (612) on the remote peer based on the local composite and the process 600 ends.

Figure 7:
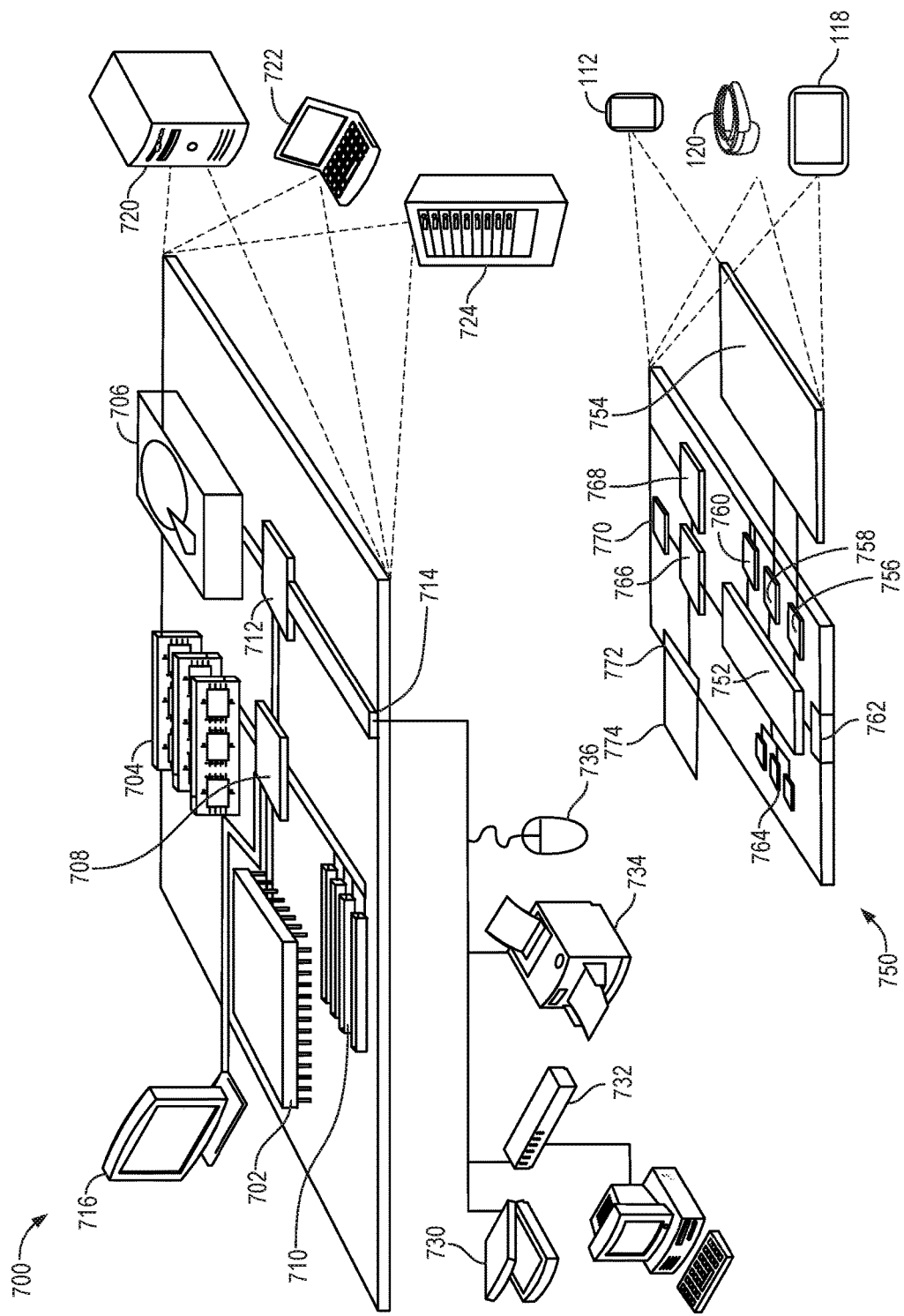
FIG. 7 depicts an example of a computing device and a mobile computing device that are employed to execute implementations of the present disclosure.

FIG. 7 depicts an example of a computing device 700 and a mobile computing device 750 that are employed to execute implementations of the present disclosure. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 700 includes a processor 702, a memory 704, a storage device 706, a high-speed interface 708, and a low-speed interface 712. In some implementations, the high-speed interface 708 connects to the memory 704 and multiple high-speed expansion ports 710. In some implementations, the low-speed interface 712 connects to a low-speed expansion port 714 and the storage device 706. Each of the processor 702, the memory 704, the storage device 706, the high-speed interface 708, the high-speed expansion ports 710, and the low-speed interface 712, are interconnected using various buses, and may be mounted on a common motherboard or in other manners as appropriate. The processor 702 can process instructions for execution within the computing device 700, including instructions stored in the memory 704 and/or on the storage device 706 to display graphical information for a graphical user interface (GUI) on an external input/output device, such as a display 716 coupled to the high-speed interface 708. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of a computer-readable medium, such as a magnetic or optical disk.

The storage device 706 is capable of providing mass storage for the computing device 700. In some implementations, the storage device 706 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 702, perform one or more methods, such as those described above. The instructions can also be stored by one or more storage devices, such as computer-readable or machine-readable mediums, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards. In the implementations, the low-speed interface 712 is coupled to the storage device 706 and the low-speed expansion port 714. The low-speed expansion port 714, which may include various communication ports (e.g., Universal Serial Bus (USB), Bluetooth, Ethernet, wireless Ethernet) may be coupled to one or more input/output devices. Such input/output devices may include a scanner 730, a printing device 734, or a keyboard or mouse 736. The input/output devices may also be coupled to the low-speed expansion port 714 through a network adapter. Such network input/output devices may include, for example, a switch or router 732.

The computing device 700 may be implemented in a number of different forms, as shown in the FIG. 7. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may contain one or more of the computing device 700 and the mobile computing device 750, and an entire system may be made up of multiple computing devices communicating with each other.

The mobile computing device 750 includes a processor 752; a memory 764; an input/output device, such as a display 754; a communication interface 766; and a transceiver 768; among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate. In some implementations, the mobile computing device 750 may include a camera device(s) (not shown).

The processor 752 can execute instructions within the mobile computing device 750, including instructions stored in the memory 764. The processor 752 may be implemented as a chipset of chips that include separate and multiple analog and digital processors. For example, the processor 752 may be a Complex Instruction Set Computers (CISC) processor, a Reduced Instruction Set Computer (RISC) processor, or a Minimal Instruction Set Computer (MISC) processor. The processor 752 may provide, for example, for coordination of the other components of the mobile computing device 750, such as control of user interfaces (UIs), applications run by the mobile computing device 750, and/or wireless communication by the mobile computing device 750.

The processor 752 may communicate with a user through a control interface 758 and a display interface 756 coupled to the display 754. The display 754 may be, for example, a Thin-Film-Transistor Liquid Crystal Display (TFT) display, an Organic Light Emitting Diode (OLED) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a Single in Line Memory Module (SIMM) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provided as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 752, perform one or more methods, such as those described above. The instructions can also be stored by one or more storage devices, such as one or more computer-readable or machine-readable mediums, such as the memory 764, the expansion memory 774, or memory on the processor 752. In some implementations, the instructions can be received in a propagated signal, such as, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 768 using a radio frequency. In addition, short-range communication, such as using a Bluetooth or Wi-Fi, may occur. In addition, a Global Positioning System (GPS) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in FIG. 7. For example, it may be implemented as the form of the mobile devices described in FIG. 1, such as the mobile device 112, the tablet device 118, and the AR devices 116 and 120. The mobile computing device 750 may also be implemented as a component of a smartphone, personal digital assistant, AR device, or other similar mobile device.

Computing device 700 and/or 750 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 110 of FIG. 1. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for displaying a three-dimensional (3D) augmented reality (AR) of an environment, the method being executed by one or more processors and comprising:

formulating a geometry of the environment that is in proximity to a host peer, based on sensor data collected from the environment by at least one sensor;

determining, by the host peer, an occlusion mesh of the environment based on the formulated geometry;

capturing, with a camera, a plurality of video frames of the environment and spatial transform data of the camera within the geometry of the environment for each captured video frame;

synchronizing each of the video frames with the respective spatial transform data of the camera and the occlusion mesh; and communicating, to a first remote peer that is remote from the host peer, the video frames, the synchronized spatial transform data of the camera, and the occlusion mesh;

wherein the first remote peer is configured to generate a local composite of a first 3D image overlay with each of the video frames such that the first 3D image overlay is synchronized to each of the video frames, wherein the first 3D image overlay is occluded by the occlusion mesh relative to a respective correspondence within the environment to generate the local composite that is oriented and occluded relative to each of the video frames and the synchronized spatial transform data, wherein the first 3D image overlay is generated on the first remote peer; and wherein the first remote peer is further configured to display the local composite as a 3D AR of the environment that is in proximity to the host peer.

2. The method of claim 1 comprising:

rendering, by the remote peer, a 3D element, wherein the local composite includes compositing the 3D element onto each of the video frames.

3. The method of claim 2, wherein compositing the 3D element onto each of the video frames includes mapping feature points of the 3D element.

4. The method of claim 1, wherein the synchronized spatial transform data is provided to the remote peer as header data.

5. The method of claim 1, wherein the video frames are provided to the remote peer through a first stream, wherein the synchronized spatial transform data is provided to the remote peer through a second stream.

6. The method of claim 5 comprising:

determining, by the remote peer, an average frame offset for a time difference between a host clock and a local clock; and synchronizing, by the remote peer, the first and second streams based on the average frame offset.

7. The method of claim 1, wherein the spatial transform data of the camera is determined through an inertial measurement unit (IMU) sensor that detects linear acceleration of the camera and a rotational rate of the camera using one or more depth sensors.

8. The method of claim 1 comprising:

determining a focal point in the geometry of the environment based on the spatial transform data of the camera; and defining an origin of a coordinate system for the camera according to the focal point.

9. The method of claim 8, wherein the focal point is determined at a Euclidean geometry of 0x, 0y, 0z, such that a Z projection from the focal point is positive from the focal point.

10. The method of claim 1, wherein each of the video frames is synchronized with the respective spatial transform data of the camera and the occlusion mesh in a manner that compensates for a clock drift that varies over time as the video frames, the synchronized spatial transform data, and the occlusion mesh are provided to the remote peer.

11. One or more non-transitory computer-readable storage media coupled to one or more processors and having instructions stored thereon which, when executed by the one or more processors, cause the one or more processors to perform operations comprising:

formulating a geometry of an environment that is in proximity to a host peer, based on sensor data collected from the environment by at least one sensor;

determining, by the host peer, an occlusion mesh of the environment based on the formulated geometry;

capturing, with a camera, a plurality of video frames of the environment and spatial transform data of the camera within the geometry of the environment for each captured video frame;

synchronizing each of the video frames with the respective spatial transform data of the camera and the occlusion mesh; and communicating, to a first remote peer that is remote from the host peer, the video frames, the synchronized spatial transform data of the camera, and the occlusion mesh;

wherein the first remote peer is configured to generate a local composite of a first 3D image overlay with each of the video frames such that the first 3D image overlay is synchronized to each of the video frames, wherein the first 3D image overlay is occluded by the occlusion mesh relative to a respective correspondence within the environment to generate the local composite that is oriented and occluded relative to each of the video frames and the synchronized spatial transform data, wherein the first 3D image overlay is generated on the first remote peer; and wherein the first remote peer is further configured to display the local composite as a 3D AR of the environment that is in proximity to the host peer.

12. The one or more non-transitory computer-readable media of claim 11, wherein the spatial transform data of the camera is determined through an inertial measurement unit (IMU) sensor that detects linear acceleration of the camera and a rotational rate of the camera using one or more depth sensors.

13. The one or more non-transitory computer-readable media of claim 11, wherein the operations comprise:

determining a focal point in the geometry of the environment based on the spatial transform data of the camera; and defining an origin of a coordinate system for the camera according to the focal point.

14. The one or more non-transitory computer-readable media of claim 13, wherein the focal point is determined at a Euclidean geometry of 0x, 0y, 0z, such that a Z projection from the focal point is positive from the focal point.

15. A system, comprising:

one or more remote peers each comprising a three-dimensional (3D) accelerated graphics chip and a display;

a one or more processors; and a computer-readable storage device coupled to the one or more processors and having instructions stored thereon which, when executed by the one or more processors, cause the one or more processors to perform operations comprising:

formulating a geometry of an environment that is in proximity to a host peer, based on sensor data collected from the environment by at least one sensor;

determining, by the host peer, an occlusion mesh of the environment based on the formulated geometry;

capturing, with a camera, a plurality of video frames of the environment and spatial transform data of the camera within the geometry of the environment for each captured video frame;

synchronizing each of the video frames with the respective spatial transform data of the camera and the occlusion mesh; and communicating, to a first remote peer that is remote from the host peer, the video frames, the synchronized spatial transform data of the camera, and the occlusion mesh;

wherein the first remote peer is configured to generate a local composite of a first 3D image overlay with each of the video frames such that the first 3D image overlay is synchronized to each of the video frames, wherein the first 3D image overlay is occluded by the occlusion mesh relative to a respective correspondence within the environment to generate the local composite that is oriented and occluded relative to each of the video frames and the synchronized spatial transform data, wherein the first 3D image overlay is generated on the first remote peer; and wherein the first remote peer is further configured to display the local composite as a 3D AR of the environment that is in proximity to the host peer.

16. The system of claim 15, wherein each of the video frames is synchronized with the respective spatial transform data of the camera and the occlusion mesh in a manner that compensates for a clock drift that varies over time as the video frames, the synchronized spatial transform data, and the occlusion mesh are provided to the remote peer.

17. The system of claim 16, wherein the operations comprise:
rendering, by the remote peer, a 3D element, wherein the local composite includes compositing the 3D element onto each of the video frames.

18. The system of claim 16, wherein the synchronized spatial transform data is provided to the remote peer as header data.

19. The system of claim 16, wherein the video frames are provided to the remote peer through a first stream, wherein the synchronized spatial transform data is provided to the remote peer through a second stream.

20. The system of claim 19, wherein the operations comprise:
determining, by the remote peer, an average frame offset for a time difference between a host clock and a local clock; and
synchronizing, by the remote peer, the first and second streams based on the average frame offset.

* * * * *

UNITED STATES PATENT AND TRADEMARK OFFICE
CERTIFICATE OF CORRECTION

PATENT NO. : 10,380,804 B1  
APPLICATION NO. : 16/042010  
DATED : August 13, 2019  
INVENTOR(S) : Mario Pintaric, Kyle Thomas Foley and Adrian James Hatch Page 1 of 1

It is certified that error appears in the above-identified patent and that said Letters Patent is hereby corrected as shown below:

On the Title Page

Column 2 (Other Publications), Line 1, delete "3," and insert -- 30, --, therefor.

In the Claims

In Claim 17, Column 20, Line 3, delete "claim 16," and insert -- claim 15, --, therefor.

In Claim 18, Column 20, Line 8, delete "claim 16," and insert -- claim 15, --, therefor.

In Claim 19, Column 20, Line 11, delete "claim 16," and insert -- claim 15, --, therefor.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*